United States Patent
Dixon et al.

(10) Patent No.: US 11,599,599 B1
(45) Date of Patent: Mar. 7, 2023

(54) EMULATING A TRANSPARENCY EFFECT FOR A DISPLAY ELEMENT

(71) Applicant: Microsoft Technology Licensing, LLC, Redmond, WA (US)

(72) Inventors: Zachary William Dixon, Redmond, WA (US); Prasanna Chromepet Padmanabhan, Redmond, WA (US); Jinhua Fei, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/514,144

(22) Filed: Oct. 29, 2021

(51) Int. Cl.
*G06F 3/048* (2013.01)
*G06F 16/957* (2019.01)
*G06F 3/0482* (2013.01)

(52) U.S. Cl.
CPC ........ *G06F 16/9577* (2019.01); *G06F 3/0482* (2013.01)

(58) Field of Classification Search
None
See application file for complete search history.

(56) References Cited

U.S. PATENT DOCUMENTS

| | | | |
|---|---|---|---|
| 6,587,118 B1* | 7/2003 | Yoneda | G06F 3/0481 715/764 |
| 2010/0070889 A1* | 3/2010 | Weisbart | G06F 16/957 709/206 |
| 2017/0262991 A1* | 9/2017 | Davidson | G06T 11/001 |

OTHER PUBLICATIONS

"CSS Image-Rendering Property", Retrieved From: https://www.w3docs.com/learn-css/image-rendering.html, Retrieved Date: Nov. 10, 2021, 7 Pages.

Karkovack, Eric, "10 Snippets for Creating Unique Background Effects with CSS", Retrieved From: https://speckyboy.com/css-background-effects/, May 12, 2021, 14 Pages.

Mcmahon, Thomas, "Customizing Toolbar Backgrounds", Retrieved From: https://www.twistermc.com/1180/customizing-toolbar-backgrounds/, May 15, 2007, 4 Pages.

* cited by examiner

*Primary Examiner* — Thanh T Vu
(74) *Attorney, Agent, or Firm* — Weaver IP L.L.C.

(57) ABSTRACT

Methods, systems, apparatuses, and computer-readable storage mediums described herein are directed to emulating a semi-transparent effect with respect to a display element rendered via a GUI. The semi-transparent effect may be generated based on a sampling of pixel values of another display element that is non-overlapping with the display element. For instance, pixel values of a portion of the other display element that is adjacent to an edge of the display element may be determined. Using the determined pixel values, a visualization scheme is generated that emulates a visual effect (e.g., a blur effect). The determined visualization scheme is then applied to the display element. This causes the display element to appear semi-transparent such that the colors of the other display element appear to be behind the display element, thereby creating an effect that the display element is overlaid on top of the other display element.

20 Claims, 9 Drawing Sheets

EMULATING A TRANSPARENCY EFFECT FOR A DISPLAY ELEMENT

BACKGROUND

Transparency is the effect created when a display element, such as a color block, text or image, is desaturated so that the color is diluted, thereby causing content behind the display element to show through. Transparency is a common desire in user interface design. It may be used to create visual interest, to contrast elements, to create depth, etc. While supported in a desktop environment, transparency is difficult to achieve in a web context, especially for display elements that are non-overlapping with other display elements.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are directed to emulating a semi-transparent effect with respect to a display element rendered via a graphical user interface (GUI). The semi-transparent effect may be generated based on a sampling of pixel values of another display element that is non-overlapping with the display element. For instance, pixel values of a portion of the other display element that is adjacent to an edge of the display element may be determined. Using the determined pixel values, a visualization scheme is generated that emulates a visual effect (e.g., a color gradient that emulates a blur effect). The determined visualization scheme is then applied to the display element. This causes the display element to appear semi-transparent such that the colors of the other display element appear to be behind the display element, thereby creating an effect that the display element is overlaid on top of the other display element.

The embodiments described herein provide an improved user interface. For instance, consider a scenario in which the display element is a toolbar provided by a web application (e.g., a remote desktop application, a remote (or cloud-based) remote computing device provisioning and management application) and the non-overlapping display element is content representative of the remote computing session (e.g., a desktop displayed via the remote computing device, a browser window rendered via the remote computing device). The techniques described herein unify the experience between the web application and the remote content, thereby providing a less disjointed user experience.

The embodiments described herein also improve the functioning of a computing device on which the techniques described herein are performed. For instance, consider a scenario in which such techniques are applied via a web page. As described herein, a visual effect (e.g., a color gradient) is generated based on an averaging of pixel values of various segments of the portion of the display element that is non-overlapping with the display element. The visual effect may be applied to the display element via updating a cascading style sheet property of the display element. Such a technique is less compute intensive than other approaches. For instance, consider an approach in which each pixel value that comprises the portion of the display element is copied (i.e., a copy of the actual portion is generated) and applied to a new canvas element that is rendered over the display element. Rendering content via a canvas element is a more compute expensive operation than updating a cascading style sheet property. Accordingly, the embodiments described herein reduce the amount of compute resources (e.g., processing cycles, memory) to emulate a semi-transparent effect for a display element.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
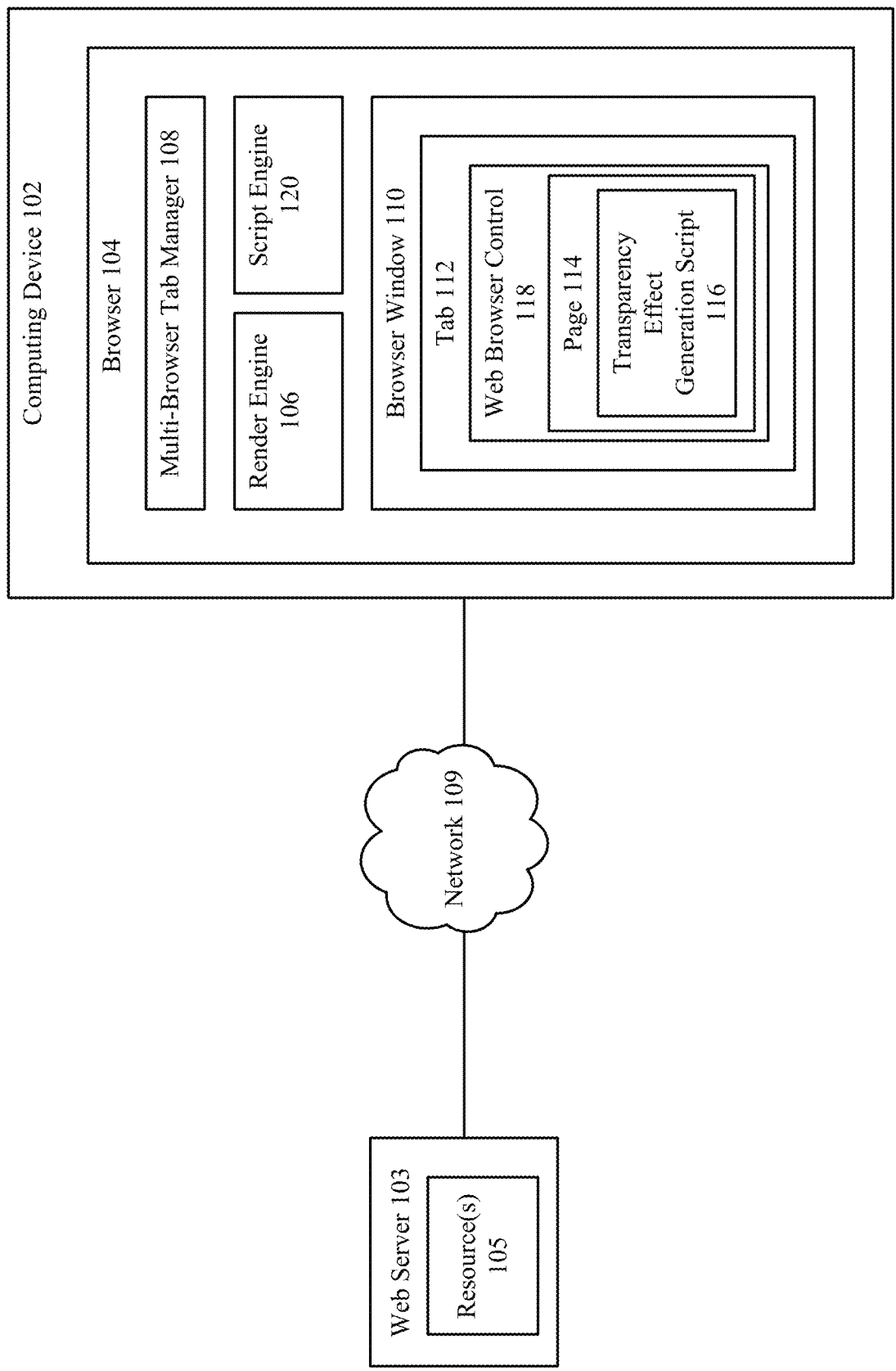
FIG. 1 shows a block diagram of a system for emulating semi-transparency for a display element in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements.

The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, terms such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embodiments described herein are directed to emulating a semi-transparent effect with respect to a display element rendered via a graphical user interface (GUI). The semi-transparent effect may be generated based on a sampling of pixel values of another display element that is non-overlapping with the display element. For instance, pixel values of a portion of the other display element that is adjacent to an edge of the display element may be determined. Using the determined pixel values, a visualization scheme is generated that emulates a visual effect (e.g., a color gradient that emulates a blur effect). The determined visualization scheme is then applied to the display element. This causes the display element to appear semi-transparent such that the colors of the other display element appear to be behind the display element, thereby creating an effect that the display element is overlaid on top of the other display element.

The embodiments described herein provide an improved user interface. For instance, consider a scenario in which the display element is a toolbar provided by a web application (e.g., a remote desktop application, a remote (or cloud-based) remote computing device provisioning and management application) and the non-overlapping display element is content representative of the remote computing session (e.g., a desktop displayed via the remote computing device, a browser window rendered via the remote computing device). The techniques described herein unify the experience between the web application and the remote content, thereby providing a less disjointed user experience.

The embodiments described herein also improve the functioning of a computing device on which the techniques described herein are performed. For instance, consider a scenario in which such techniques are applied via a web page. As described herein, a visual effect (e.g., a color gradient) is generated based on an averaging of pixel values of various segments of the portion of the display element that is non-overlapping with the display element. The visual effect may be applied to the display element via updating a cascading style sheet property of the display element. Such a technique is less compute intensive than other approaches. For instance, consider an approach in which each pixel value that comprises the portion of the display element is copied (i.e., a copy of the actual portion is generated) and applied to a new canvas element that is rendered over the display element. Rendering content via a canvas element is a more compute expensive operation than updating a cascading style sheet property. Accordingly, the embodiments described herein reduce the amount of compute resources (e.g., processing cycles, memory) to emulate a semi-transparent effect for a display element.

Such embodiments may be implemented in various ways. For instance, FIG. 1 shows a block diagram of a system 100 for emulating semi-transparency for a display element, according to an example embodiment. As shown in FIG. 1, system 100 includes a computing device 102 and a web server 103. Computing device 102 and web server 103 are communicatively coupled via a network 109. As described herein, networks, such as network 109, may comprise one or more networks such as local area networks (LANs), wide area networks (WANs), enterprise networks, the Internet, etc., and may include one or more of wired and/or wireless portions.

Web server 103 may host one or more resources 105. Resources 105 may comprise a web application, a web service, web pages, scripts (e.g., JavaScript-based scripts, TypeScript-based scripts), IFRAME content, cascading style sheets (CSS), images, audio files, video files, web fonts, embeddable objects, etc.

Computing device 102 includes a browser application ("browser") 104. Browser 104 includes a render engine 106, a script engine 120, and a multi-browser tab manager 108. Browser 104 also has an open browser window 110. Browser window 110 includes a tab 112 displaying a web page 114 that is rendered by render engine 106 of browser 104.

Computing device 102 is a computing device via which a user is enabled to run applications and visit web pages compatible with various web browsers. Computing device 102 may be any type of mobile computing device, such as a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system), a wearable computing device (e.g., a head-mounted device including smart glasses such as Google® Glass™, a virtual headset such as Oculus Rift® by Oculus VR, LLC or HoloLens® by Microsoft Corporation), a stationary computing device such as a desktop computer or PC (personal computer), or other browser-enabled device.

Browser 104 is a web browser application, which is a software application configured for accessing information on the World Wide Web. For instance, browser 104 enables network information resources to be retrieved, presented, and traversed. An information resource (e.g., resource(s) 105) may be accessed by browser 104 using a network address, such as a uniform resource identifier. For instance, browser 104 may provide a request via network 109 for resource(s) 105 to web server 103. Web server 103 may provide a response comprising resource(s) 109 via network 109. In the example shown in FIG. 1, such resource(s) include web page 114 and transparency effect generation script 116. Examples of browser 104 includes Internet Explorer® or Microsoft Edge®, both developed by Microsoft Corp. of Redmond, Wash., Mozilla Firefox®, developed by Mozilla Corp. of Mountain View, Calif., Safari®, developed by Apple Inc. of Cupertino, Calif., and Google® Chrome™ developed by Google Inc. of Mountain View, Calif.

Multi-tab manager 108 (also referred to as the browser frame layer) may be configured to manage one or more tabs (e.g., tab 112). Tab 112 may comprise a web browser control 118 and/or other layers of functionality. Web browser control 118 (also referred to as WebOC) enables browsing, document viewing, and data downloading capabilities. Web browser control 118 enables the user to browse sites via the Internet, as well as folders in the local file system of computing device 102 and on a network. Web browser control 118 supports Web browsing through both point-and-click hyperlinking and uniform resource locator (URL) navigation. Web pages shown via multi-tab manager 108, tab 112, and/or web browser control 118 are rendered via render engine 106.

Render engine 106 of browser 104 is configured to generate a display of content in browser tabs of browser windows, including transforming HTML (hypertext markup language) documents and other resources of a web page into an interactive visual representation. In an embodiment, render engine 106 may be configured to perform page layout and rendering of content in accordance with the source code (e.g., HTML, CSS) of page 114. Script engine 120 is configured to execute scripts (e.g., TypeScript-based scripts, JavaScript-based scripts) loaded for page 114. As will be described below, such scripts may modify the appearance of certain display elements displayed via page 114. Such scripts may be loaded for page 114 and/or a web service or web application via which page 114 is displayed. Examples of such web services and/or applications include, but are not limited to, Windows 365™ and Office 365™, each of which are published by Microsoft® Corporation of Redmond, Wash. Examples of render engines include Gecko™ used in the Mozilla Firefox® web browser, the WebKit™ engine used by the Apple Safari browser, Trident™ (MSHTML) used in Internet Explorer™, and Blink™ used in the Google Chrome and Microsoft Edge Browsers.

As further shown in FIG. 1, page 114 may comprise a transparency effect generation script 116 loaded therefor. Transparency effect generation script 116, when executed by script engine 120 of browser 104, causes a display element (e.g., a display element rendered via an HTML-based div tag) displayed via page 114 to appear as if it is semi-transparent. For instance, transparency effect generation script 116 may be configured to determine a visualization scheme for a particular display element. The visualization scheme may emulate a visual effect. The visualization scheme may be based on pixel values used for another display element displayed via page 114 (e.g., a graphic rendered via an HTML-based canvas tag, an image rendered via an HTML-based image tag, video content rendered via an HTML-based video tag). For instance, the pixel values of a portion of a display element that is adjacent to a particular edge of the particular display element and non-overlapping with the particular display element may be utilized to generate the visualization scheme. The visual effect causes the particular display element to appear as if it is overlaid on top of a portion of the other display element and semi-transparent even though it is not overlaid on top of the other display element. An example of the visual effect, includes, but is not limited to a blur effect, in which the colors of the portion of the other display element appear to be smeared and/or dim when applied to the particular display element. However, it is noted that other types of effects (e.g., a pixilation effect that emulates a pixilation of the portion of the other display element, a distortion effect that emulates a distortion (e.g., the stretching, lengthening, shortening, etc.) of the portion of the other display element, etc.) may be emulated in accordance with the embodiments described herein. In accordance with an embodiment, transparent effect generation script 116 is a TypeScript-based script and/or JavaScript-based script; however, the embodiments described herein are not so limited.

Figure 2A:
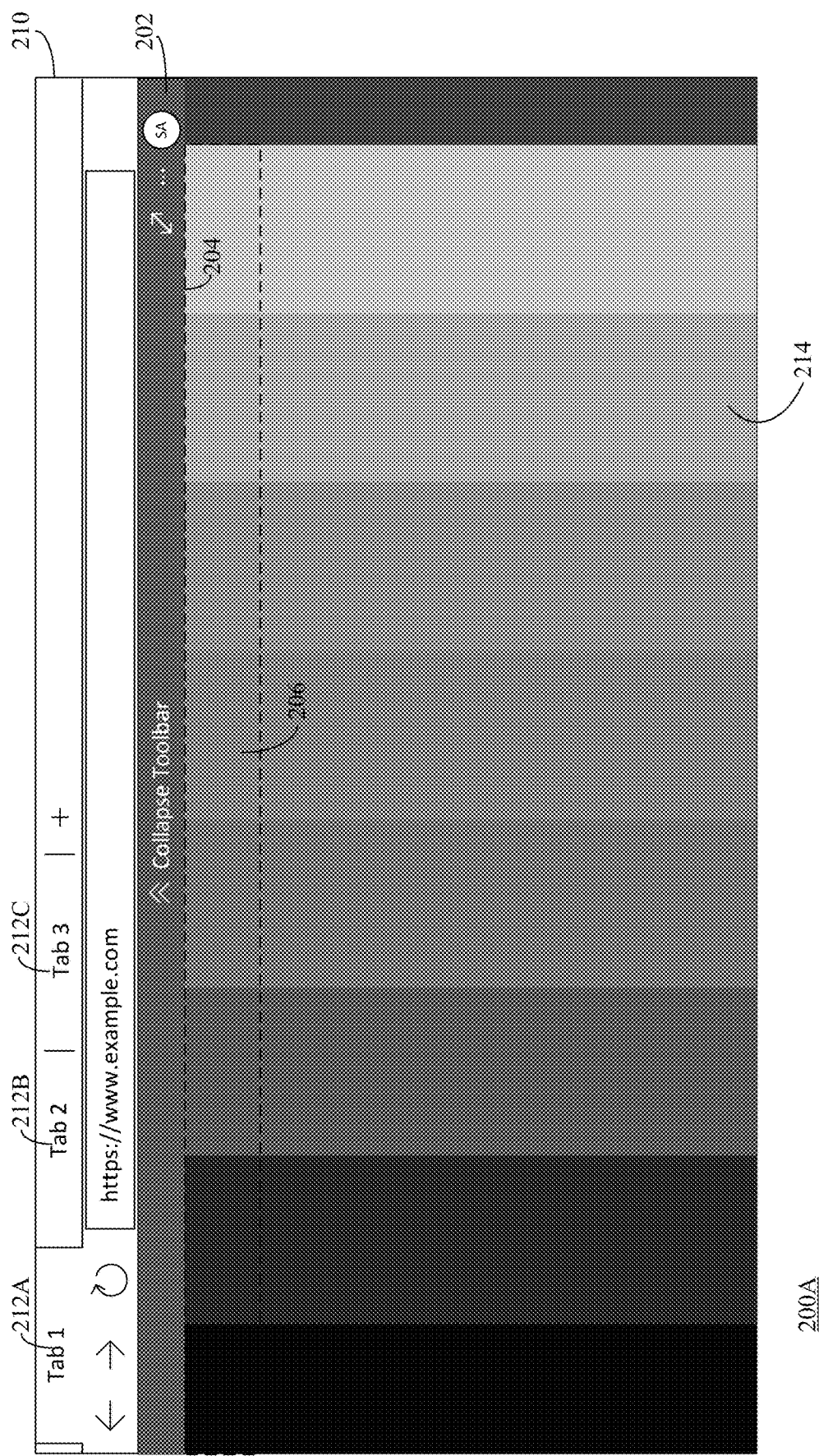
FIG. 2A depicts an example graphical user interface (GUI) screen comprising a browser window in accordance with an example embodiment.
Figure 2B:
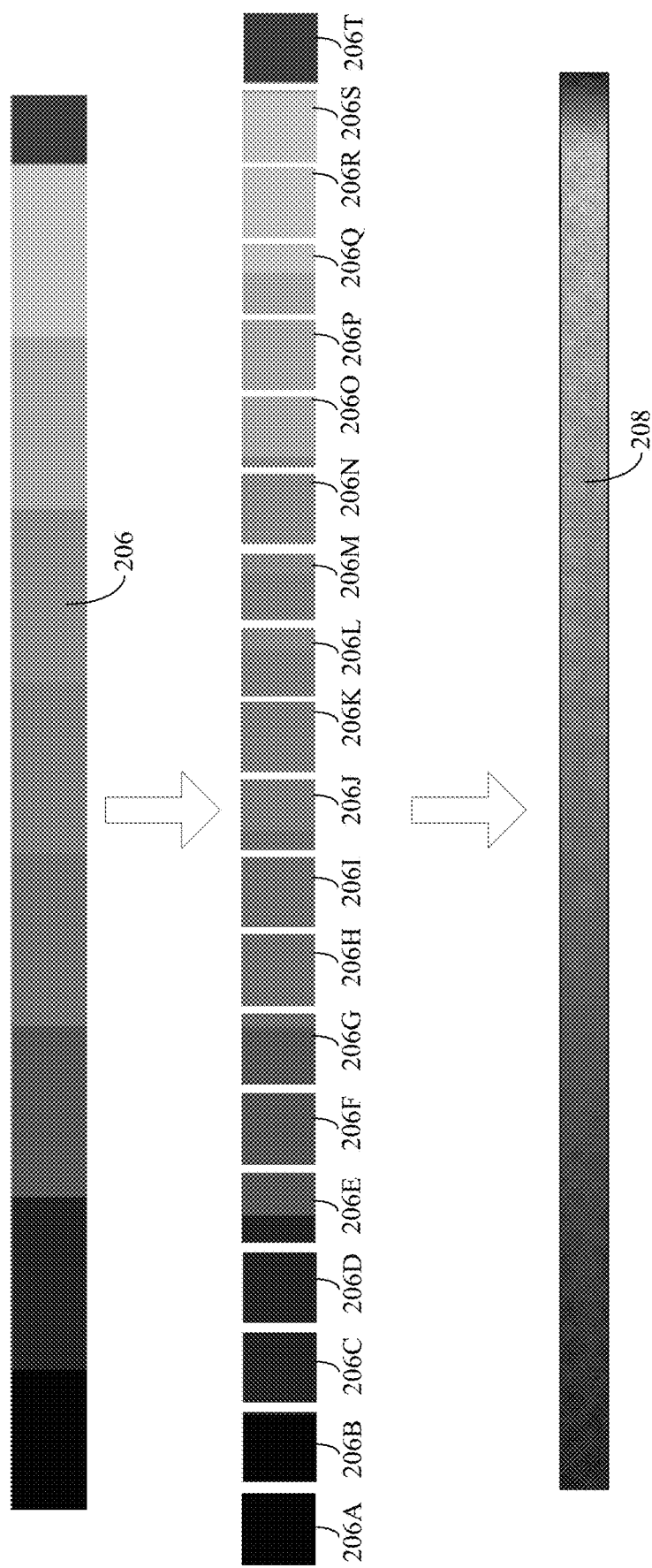
FIG. 2B depicts a visual representation of a portion of a display element that is subdivided to determine average pixel values in accordance with an example embodiment.
Figure 2C:
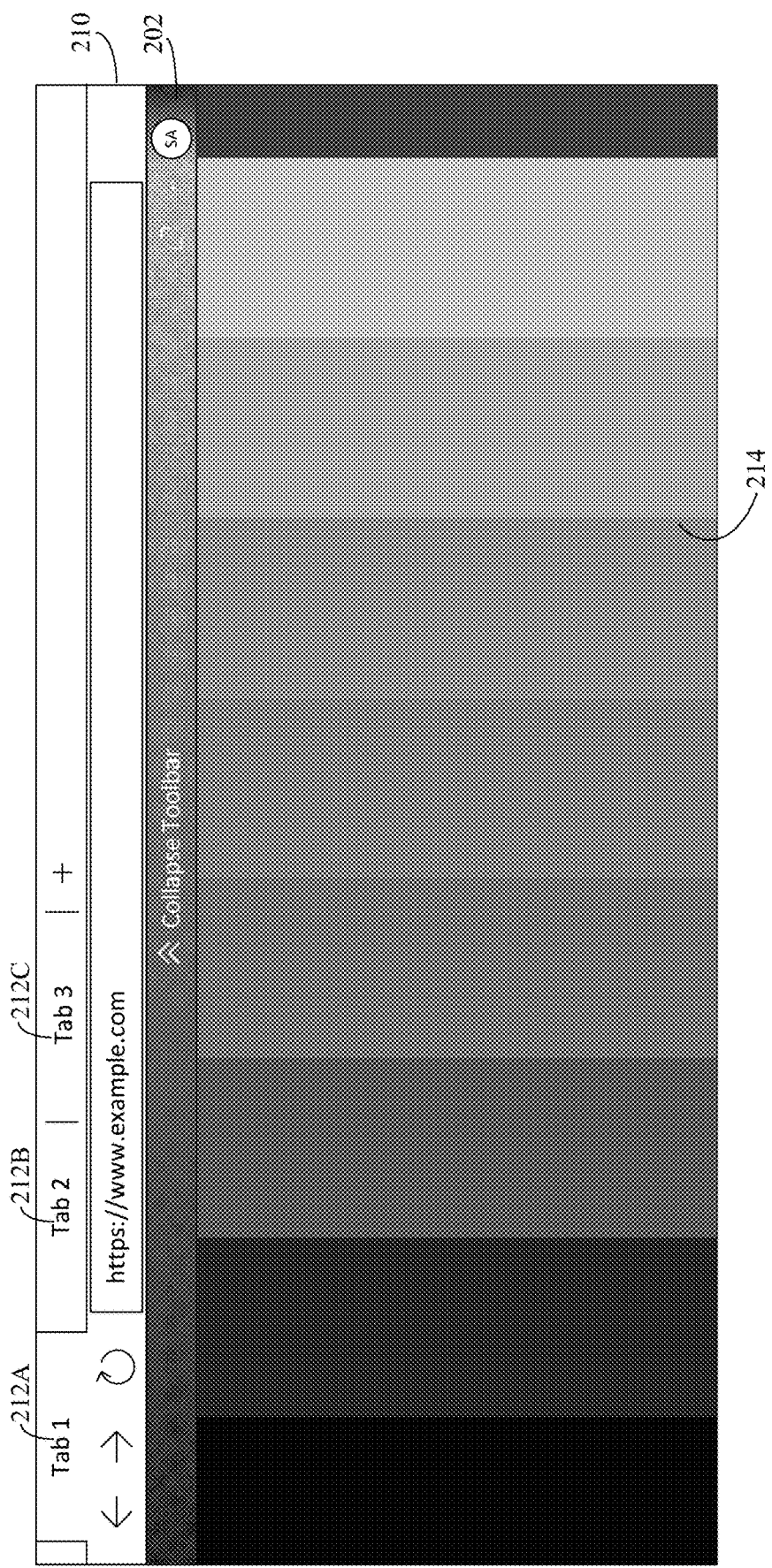
FIG. 2C depicts an example GUI screen comprising a browser window in which a visualization scheme has been applied to a display element in accordance with an example embodiment.

FIGS. 2A-2C depict the process of generating and applying a visualization scheme for a display element. For example, FIG. 2A depicts an example graphical user interface (GUI) screen 200A comprising a browser window 210 in accordance with an example embodiment. Browser window 210 is an example of browser window 110, as described above with reference to FIG. 1. As shown in FIG. 2A, browser window 210 comprises three tabs 212A, 212B, and 212C, each of which being an example of tab 112, as described above with reference to FIG. 1. As further shown in FIG. 2A, tab 212A has a web page 214 (i.e., www.example.com) opened, which is an example of page 114, as described above with reference to FIG. 1. In the example shown in FIG. 2A, tab 212A is active, and therefore, the contents of web page 214 are displayed in browser window 110.

The content of web page 214 may comprise a graphic rendered via a hypertext markup language (HTML)-based canvas tag, an image rendered via an HTML-based image tag, video content rendered via an HTML-based video tag, etc. Such content may be rendered by render engine 106 (as shown in FIG. 1). For instance, render engine 106 may parse the source code of web page 214 and render the content in accordance with tags included therein. In the example shown in FIG. 2A, the content rendered comprises a graphic comprising a plurality of vertical bars, each being a different color.

As further shown in FIG. 2A, a menu toolbar 202 is rendered via web page 210 by render engine 106. For instance, render engine 106 may parse the source of web page 214 and render menu toolbar 202 in accordance with tags included therein. For instance, menu toolbar 202 may be generated via an HTML-based div tag. Menu toolbar 202 may be opaque (i.e., have an opacity level of 100% such that menu toolbar 202 does not have any transparency) and is rendered such that is not overlapping with the displayed graphic. In other words, the graphic is rendered below menu toolbar 202 and no portion of the graphic overlaps with menu toolbar 202. In an embodiment, menu toolbar 202 is associated with a remote computing device provisioning and management application, such as, but not limited to Windows 365™. In accordance with such an embodiment, menu toolbar 202 enables a user to manage one or more remote computing devices (e.g., cloud-based machines) provisioned therefor. In addition, an instance of a browser application (e.g., browser application 210) may be executed on such a remote computing device, and web page 214 may be displayed via the remote browser application instance.

As shown in FIG. 2A, the graphic rendered via web page 214 may comprise a plurality of different colors. As will be described below, a visualization scheme for menu toolbar 202 may be generated based on such colors, where the visualization scheme causes menu toolbar 202 to appear semi-transparent and overlaid on top of the graphic. In accordance with an embodiment, transparency effect generation script 116, when executed by script engine 120 of browser 104, periodically samples (e.g., every 2 seconds) a predetermined portion of the graphic from which pixel values will be determined. The portion may be adjacent to a predetermined edge of menu toolbar. For instance, transparency effect generation script 116 may determine a portion 206 of the graphic that is adjacent to a bottom edge 204 of menu toolbar 202, as bottom edge 204 is the most proximate to the graphic. The portion may have a width of the graphic and a predetermined height from bottom edge 204. In accordance with an embodiment, the predetermined height is 40 pixels from bottom edge 204; however, it is noted that this value is purely exemplary and other predetermined heights may be utilized. It is noted that while the examples described herein describe that a portion adjacent to an edge of menu toolbar 202 is utilized for sampling, any portion (either adjacent or non-adjacent) of any content displayed via web page 214 may be utilized to generate the visualization scheme.

Transparency effect generation script 116 may utilize various techniques to periodically sample the predetermined portion depending on the type of content being sampled. For instance, in a scenario in which a graphic rendered via an HTML-based canvas tag is being sampled, transparency effect generation script 116 may call the getImageData( ) method of the Canvas application programming interface (API), the readPixels( ) method of the WebGL API published by Khronos WebGL (Web Graphics Library) Working Group of Beaverton, Oreg. (e.g., in instances where browser application 210 is hardware accelerated), etc. In a scenario in which an image is sampled, transparency effect generation script 116 may analyze the image directly to obtain the pixel values thereof. Alternatively, transparency effect generation script 116 may generate a non-visible canvas element, render the image to that non-visible canvas element, and sample the canvas element using the techniques described above. It is noted that for sampling video content, transparency effect generation script 116 may be configured to sample a portion thereof at a faster rate than when sampling static content, such as a graphic or an image. This way, the visualization scheme generated for toolbar 202 will more accurately represent the changing content being viewed by the user.

After determining a portion of the graphic to sample, transparency effect generation script 116, when executed by script engine 120, may subdivide the portion into a plurality of predetermined segments. For instance, transparency effect generation script 116 may divide the width of portion 206 by a predetermined number (e.g., 20). FIG. 2B depicts a visual representation 200B of portion 206 that is subdivided into twenty segments 206A-206T in accordance with an example embodiment. It is noted that transparency effect generation script 116 may be configured to subdivide a portion into any number of segments. It is further noted that segments 206A-206T are not visually rendered, but instead are shown for ease of illustration of the subdivision process performed by transparency effect generation script 116.

After determining segments 206A-206T, transparency effect generation script 116, when executed by script engine 120, may determine an average pixel value for each of segments 206A-206T. For instance, for each of segments 206A-206T, transparency effect generation script 116 may determine the pixel color value (e.g., a red, blue, and green (RGB) pixel value) for each pixel of the segment. Transparency effect generation script 116 may average the red pixel values determined for the pixels of the segment to determine an average red pixel value, may average the green pixel values determined for the pixels of the segment to determine an average green pixel value, and may average the blue pixel values determined for the pixels of the segment to determine an average blue pixel value. The determined average red pixel value, the determined average green pixel value, and the determined average blue pixel value are designated as the average pixel value for the segment. It is noted that in certain embodiments a subset of pixels of a particular segment (rather than all pixels of a particular segment) are averaged to determine the average pixel value of a particular segment. By doing so, the compute resources (e.g., processing cycles, memory, storage) required to determine the average pixel value for a particular segment are reduced; however, the accuracy of the determined average pixel value may be reduced in situations where a segment comprises a plurality of different colors. It is noted that while the embodiments described above are directed to determining pixel color values in accordance with an RGB value, other types of pixel-related values may be determined and utilized to generate an average pixel value. An example of such pixel-related values includes, but is not limited to, alpha channel values, which represent transparency information on a per-pixel basis.

An exemplary listing of determined average pixel values for each of segments 206A-206T is provided below:
  Segment 206A: rgb(10,10,10)
  Segment 206B: rgb(4,4,83)
  Segment 206C: rgb(0,0,149)
  Segment 206D: rgb(11,0,138)
  Segment 206E: rgb(149,0,0)
  Segment 206F: rgb(149,0,0)
  Segment 206G: rgb(148,0,101)
  Segment 206H: rgb(147,0,149)
  Segment 206I: rgb(114,33,115)
  Segment 206J: rgb(0,148,0)
  Segment 206K: rgb(0,148,0)
  Segment 206L: rgb(0,149,116)
  Segment 206M: rgb(0,149,148)
  Segment 206N: rgb(50,148,98)
  Segment 206O: rgb(148,148,0)
  Segment 206P: rgb(148,148,0)
  Segment 206Q: rgb(148,147,134)
  Segment 206R: rgb(148,148,148)
  Segment 206S: rgb(82,82,82)
  Segment 206T: rgb(20,20,20)

After determining the average pixel values for each of segments 206A-206T, transparency effect generation script 116 determines a visualization scheme for menu toolbar 202 that emulates a visual effect (e.g., a blur effect) based on the determined average pixel values. The visual effect is intended to make menu toolbar 202 appear as if it is semi-transparent and meant to appear overlaid on top of the graphic even though it is not actually overlaid on top of the graphic.

In accordance with an embodiment, transparency effect generation script 116 generates a color gradient based on the average pixel values to achieve the visual effect. The color gradient is utilized as the visualization scheme for menu toolbar 202. Transparency effect generation script 116 may then apply the color gradient to menu toolbar 202. For instance, transparency effect generation script 116 may update a background property of a CSS tag associated with menu toolbar 202 to call a linear gradient function that specifies the average pixel values determined for segments 206A-206T. The following snippet of code is an example of a call to the linear gradient function:

---
Code Snippet 1
---
background: linear-gradient(90deg, rgb(10,10,10) 0%,
rgb (10,10,10) 3%,
rgb(4,4,83) 8%,
rgb(0,0,149) 13%,
rgb(11,0,138) 18%,
rgb(149,0,0) 23%,
rgb(149,0,0) 28%,
rgb(148,0,101) 33%,
rgb(147,0,149) 38%,
rgb(114,33,115) 43%,
rgb(0,148,0) 48%,
rgb(0,148,0) 53%,
rgb(0,149,116)58%,
rgb(0,149,148) 63%,
rgb(50,148,98) 68%,
rgb(148,148,0) 73%,
rgb(148,148,0) 78%,
rgb(148,147,134) 83%,
rgb(148,148,148) 88%,
rgb(82,82,82) 93%,
rgb(20,20,20) 98%,
rgb(20,20,20) 100%);

---

As shown above, the linear gradient function receives a first input, which defines the gradient's angle of direction. In the example shown above, the provided angle of direction is 90 degrees, which causes the gradient to run from left to right. The linear gradient function receives additional inputs that define the various colors of the gradient (referred to as color stop values), along with stop position values for each of the colors. The stop position values in the example above are defined as percentage values, which specify the percentage of the width of menu toolbar 202 that should have an associated color; however, the embodiments described herein are not so limited.

As shown above, the linear function call comprises twenty-two color stop values and associated stop position values. The first color stop value (i.e., rgb(10,10,10)) represents the starting color value of the color gradient. It may be equal to the determined average color value for the first segment (i.e., segment 206A). The percentage value for the first color stop value is set to 0%. The final color stop value (i.e., rgb(20,20,20)) represents the ending color value of the color gradient. It may be equal to the determined average color value for the last segment (i.e., segment 206T). The percentage value for the first color stop value is set to 100%. The color stop values therebetween correspond to the determined average color values determined for each of segments 206A-206T.

To calculate a percentage value for a particular segment of segments 206A-206T, transparency effect generation script 116 divides the segment number divided by the total number of segments. In accordance with an embodiment, the segment number is offset by an offset value (e.g., 2.5). By doing so, the color transition for each segment will begin at the start of the segment, rather than starting in the middle of the section. In accordance with such an embodiment, the offset percentage value is determined in accordance with Equations 1 and 2, which is shown below:

$$\text{percentage value} = \text{floor}(\text{segment number}/\text{total number of segments}) * 100 \quad \text{(Equation 1)}$$

$$\text{offset percentage value} = \text{percentage value} - \text{floor}(\text{offset value}) \quad \text{(Equation 2)}$$

In accordance with Equations 1 and 2, in an embodiment in which the total number of segments is equal to 20 and the offset value is 2.5, the percentage value calculated for segment 206A is 3%, where segment 206A has a segment value of 1. The percentage value calculate for segment 206B is 8%, where segment 206B has a segment value of 2. The percentage value calculated for segment 206C is 13%, where segment 206C has a segment value of 3. The percentage value calculated for segment 206D is 18%, where segment 206D has a segment value of 4. The percentage value calculated for segment 206E is 23%, where segment 206E has a segment value of 5. The percentage value calculated for segment 206F is 28%, where segment 206F has a segment value of 6. The percentage value calculated for segment 206G is 33%, where segment 206G has a segment value of 7. The percentage value calculated for segment 206H is 38%, where segment 206H has a segment value of 8. The percentage value calculated for segment 206I is 43%, where segment 206I has a segment value of 9. The percentage value calculated for segment 206J is 48%, where segment 206J has a segment value of 10. The percentage value calculated for segment 206K is 53%, where segment 206K has a segment value of 11. The percentage value calculated for segment 206L is 58%, where segment 206L has a segment value of 12. The percentage value calculated for segment 206M is 63%, where segment 206M has a segment value of 13. The percentage value calculated for segment 206N is 68%, where segment 206N has a segment value of 14. The percentage value calculated for segment 206O is 73%, where segment 206O has a segment value of 15. The percentage value calculated for segment 206P is 78%, where segment 206P has a segment value of 16. The percentage value calculated for segment 206Q is 83%, where segment 206Q has a segment value of 17. The percentage value calculated for segment 206R is 88%, where segment 206R has a segment value of 18. The percentage value calculated for segment 206S is 93%, where segment 206S has a segment value of 19. The percentage value calculated for segment 206T is 98%, where segment 206T has a segment value of 20.

As shown in FIG. 2B, the foregoing snippet, when executed by script engine 120, causes a gradient-based visualization scheme 208 to be generated. Visualization scheme 208 is applied to menu toolbar 202 by updating a background property of a CSS tag associated with menu toolbar 202. The result of such applying visualization scheme 208 to menu toolbar 208 is shown in FIG. 2C. As shown in FIG. 2C, menu toolbar 208 appears to be overlaid on top of the graphic and appears to be semi-transparent, such that the colors of the graphic appear to be behind menu toolbar 208. However, menu toolbar 208 simply has visualization scheme 208 applied thereto and is not overlaid on top of the graphic.

Transparency effect generation script 116 is configured to periodically perform the foregoing operations (e.g., every 2 seconds), thus allowing the visualization scheme applied to menu toolbar 208 to be updated based on any changes of content being displayed via page 214. For instance, suppose, the user scrolls down page 214 and different content is adjacently displayed to menu toolbar 208. In such a scenario, transparency effect generation script 116 determines average pixel values for a portion of the new content adjacently displayed to menu toolbar 208, generates a color gradient based on the new average pixel values, and applies the new color gradient to menu toolbar 208.

Figure 3:
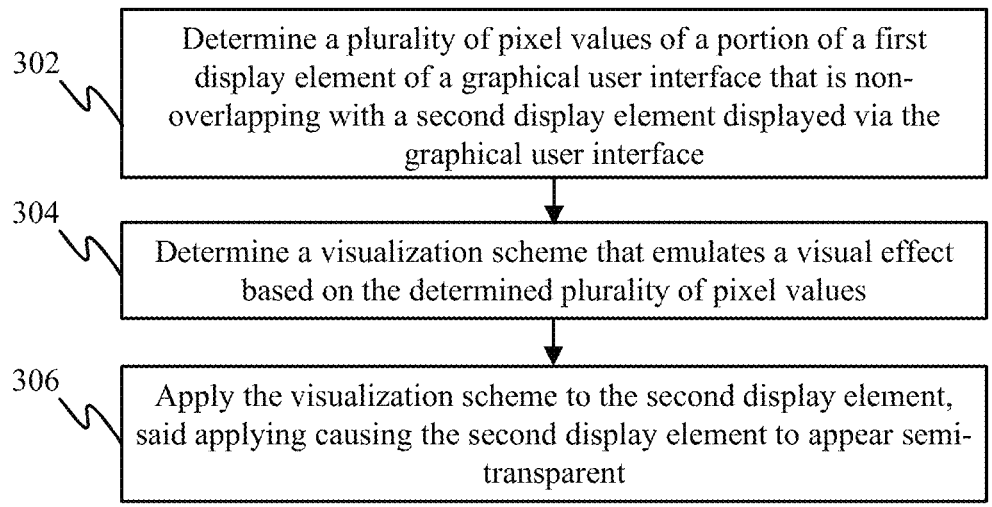
FIG. 3 shows a flowchart of a method for emulating a semi-transparency effect for a display element in accordance with an example embodiment.
Figure 4:
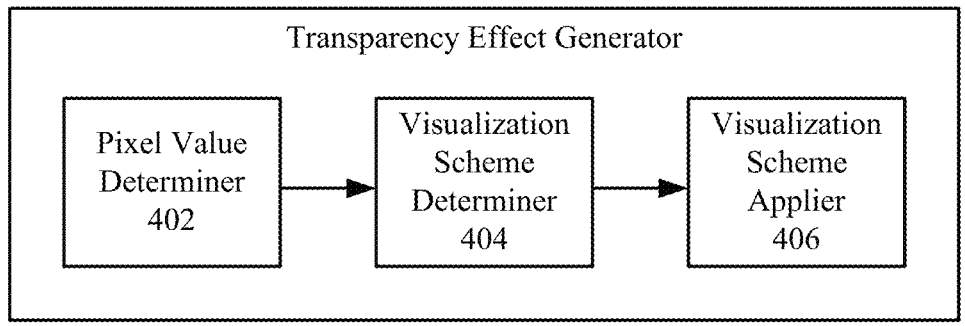
FIG. 4 shows a block diagram of a transparency effect generator in accordance with an example embodiment.

Accordingly, a semi-transparency effect may be emulated for a display element in many ways. For example, FIG. 3 shows a flowchart 300 of a method for emulating a semi-transparency effect for a display element, according to an example embodiment. In an embodiment, flowchart 300 may be implemented by transparency effect generator 400 as shown in FIG. 4. FIG. 4 shows a block diagram of transparency effect generator 400 in accordance with an example embodiment. In accordance with an embodiment, transparency effect generator 400 is an example of transparency effect generation script 116 (as shown in FIG. 1.), and therefore is executable by a script engine, such as script engine 120 as described above with reference to FIG. 1. However, it is noted that the embodiments described herein are not limited and that transparency effect generator 400 may be implemented via hardware (e.g., electrical circuits, logic). As shown in FIG. 4, transparency effect generation script 400 comprises a pixel value determiner 402, a visualization scheme determiner 404, and a visualization scheme applier 406. For purposes of illustration, flowchart 300 is described with reference to FIG. 4 and continued reference to FIGS. 2A-2C. Other structural and operational embodiments will be apparent to persons skilled in the relevant art(s) based on the following discussion.

Flowchart 300 of FIG. 3 begins with step 302. In step 302, a plurality of pixel values of a portion of a first display element of a GUI that is non-overlapping with a second display element displayed via the GUI is determined. For instance, with reference to FIGS. 2A and 4, pixel value determiner 402 is configured to determine a plurality of pixel values of portion 206 of a first display element (e.g., the graphic depicted in FIG. 2A) of web page 214 that is non-overlapping with the second display element (e.g., menu toolbar 202) displayed via web page 214.

In accordance with one or more embodiments, the portion of the first display element is adjacent to an edge of the second display element. For example, with reference to FIG. 2A, portion 206 is adjacent to bottom edge 204 of menu toolbar 204.

In accordance with one or more embodiments, the first display element comprises at least one of a graphic rendered via an HTML-based canvas tag, an image rendered via an HTML-based image tag, or video content rendered via an HTML-based video tag. For example, with reference to FIG. 2A, the first display element (e.g., the graphic shown via web page 214) may be generated via an HTML-based canvas tag.

In accordance with one or more embodiments, the second display element comprises a menu toolbar that is adjacent to the first display element. For example, with reference to FIG. 2A, the second display element (e.g., menu toolbar 202) is adjacent to the first display element (e.g., the graphic shown via web page 214).

In step 304, a visualization scheme that emulates a visual effect is determined based on the determined plurality of pixel values. For instance, and with reference to FIGS. 2B and 4, visualization scheme determiner 404 determines visualization scheme 208 that emulates a visual effect based on the plurality of pixel values determined for portion 206.

Additional details regarding determining the visualization scheme are described below with reference to FIG. 5.

In step 306, the visualization scheme is applied to the second display element. The application of the visualization scheme causes the second display element to appear semi-transparent. For example, with reference to FIGS. 2B, 2C and 4, visualization scheme applier 406 is configured to apply visualization scheme 208 to the second display element (e.g., menu toolbar 202).

Figure 5:
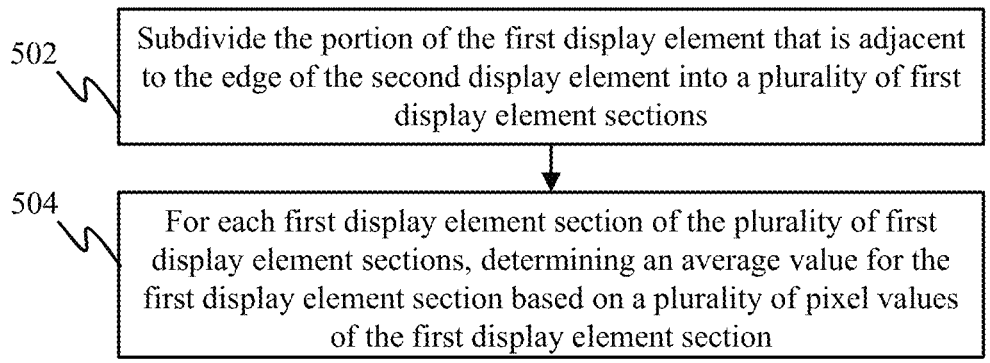
FIG. 5 shows a flowchart of a method for determining a visualization scheme in accordance with an example embodiment.

FIG. 5 shows a flowchart 500 of a method for determining a visualization scheme, according to an example embodiment. In an embodiment, flowchart 500 may be implemented by transparency effect generator 400. Accordingly, flowchart 500 will be described with continued reference to FIGS. 2A-2C and 4. Other structural and operational embodiments will be apparent to persons skilled in the relevant art(s) based on the following discussion.

Flowchart 500 of FIG. 5 begins with step 502. In step 502, the portion of the first display element that is adjacent to the edge of the second display element is subdivided into a plurality of first display element sections. For example, with reference to FIGS. 2B and 4, visualization scheme determiner 404 subdivides portion 206 into a plurality of sections 206A-206T.

In step 504, for each first display element section of the plurality of first display element sections, an average value for the first display element section is determined based on a plurality of pixel values of the first display element section. The visualization scheme is based on the average values determined for the plurality of first display element sections. For example, with reference to FIGS. 2B and 4, visualization scheme determiner 404, for each section of sections 206A-206T, determines an average value for the section based on a plurality of pixel values of the section. The visualization scheme is based on the average values determined for sections 206A-206T.

In accordance with one or more embodiments, a gradient is generated based on the average values generated for the plurality of first display element sections, the gradient being the visualization scheme. For example, with reference to FIGS. 2B and 4, visualization scheme determiner 404 determines a visualization scheme comprising a gradient (e.g., visualization scheme 208) based on the average values generated for sections 206A-206T.

In accordance with one or more embodiments, the visualization scheme is applied by updating a background property of a cascaded style sheet tag associated with the second display element to call a linear gradient function that specifies the average values generated for the plurality of first display element sections. For example, with reference to FIGS. 2B, 2C and 4, visualization scheme determiner 404 applies visualization scheme 208 to menu toolbar 202 by updating a background property of a cascaded style sheet tag associated with menu toolbar 202 to call a linear gradient function that specifies the average values generated for sections 206A-206T. An example of such an application is provided above with reference to Code Snippet 1.

The techniques described with reference to FIG. 5 advantageously improve the functioning of a computing device (e.g., computing device 102) on which such techniques are performed. For instance, consider a scenario in which such techniques are applied via a web page (e.g., web page 214). As described herein, a visual effect (e.g., a color gradient) is generated based on an averaging of pixel values of various segments of the portion of the display element that is non-overlapping with a display element (e.g., menu toolbar 202). The visual effect may be applied to the display element via updating a cascading style sheet property of the display element. Such a technique is less compute intensive than other approaches. For instance, consider an approach in which each pixel value that comprises the portion of the display element is copied (i.e., a copy of the actual portion is generated) and applied to a new canvas element that is rendered over the display element. Rendering content via a canvas element is a more compute expensive operation than updating a cascading style sheet property. Accordingly, the embodiments described herein reduce the amount of compute resources (e.g., processing cycles, memory) to emulate a semi-transparent effect for a display element.

III. Additional Example Implementations

In accordance with one or more embodiments, when determining a visualization scheme for a display element, rather than determining average pixel values of a portion (e.g., portion 206) of another display element and generating a visual effect based on the determined average pixel values, the actual pixel values of the portion may be utilized and applied to the display element. For instance, an additional canvas element may be generated that is rendered over or behind the display for which the visualization scheme is determined. Such an embodiment would be useful for instances in which certain content being displayed is desired to be copied and rendered elsewhere.

Figure 6:
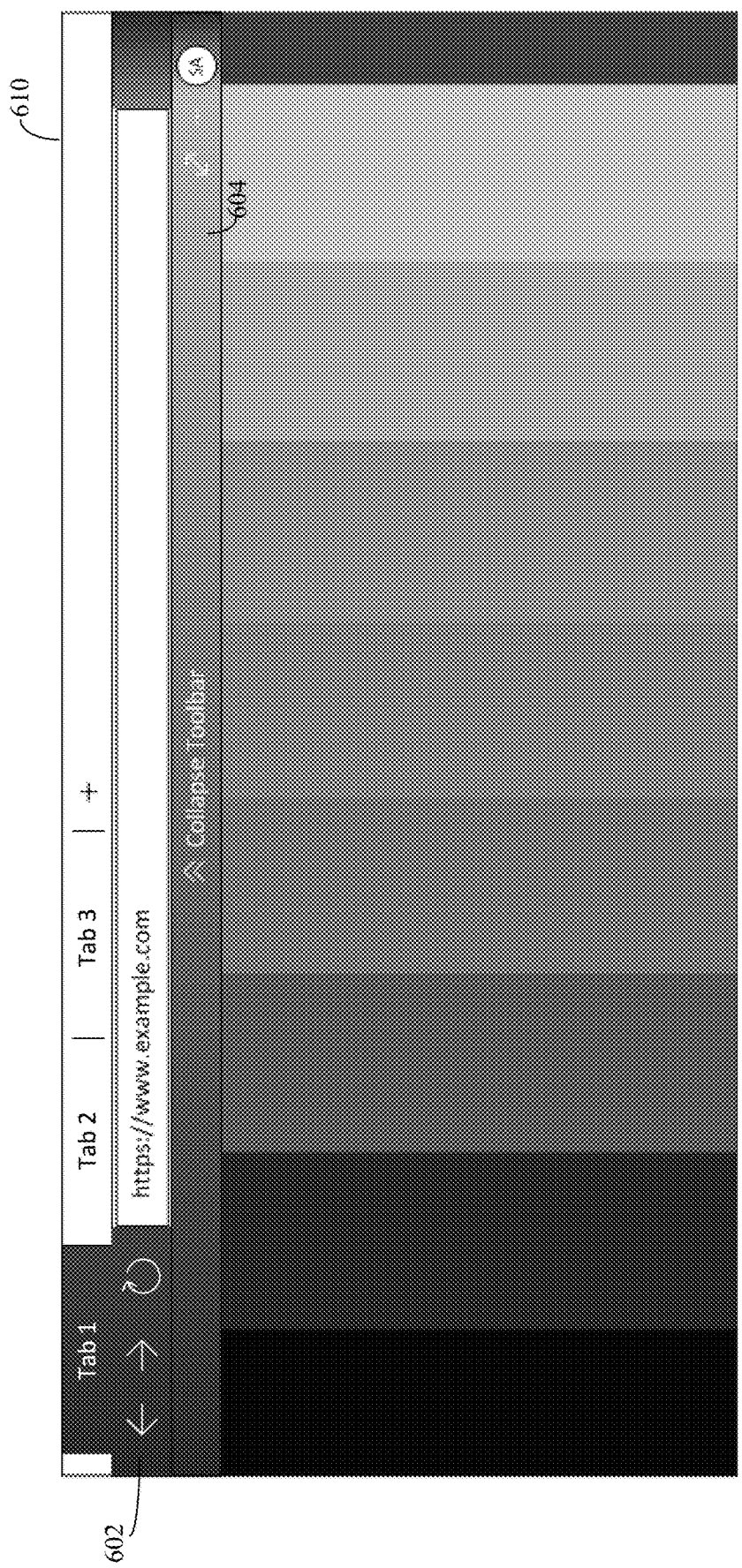
FIG. 6 depicts an example GUI screen comprising a browser window in accordance with another example embodiment.

In accordance with one or more embodiments, a determined visualization scheme (as described throughout herein), may be applied to display elements that are not displayed via a web page. For instance, browser 104 may be configured to apply the determined visualization scheme to various aspects of the graphical user interface (GUI) of browser 104. For instance, FIG. 6 depicts an example GUI screen 600 comprising a browser window 610 of a browser (e.g., browser 104) in accordance with an example embodiment. Browser window 610 is an example of browser window 210, as described above with reference to FIG. 2A. In the example shown in FIG. 6, a visualization scheme has been determined and applied to display element 604. The same visualization scheme is also applied to a GUI region 602 of the browser. GUI region 602 comprises various user-interactive interface element by which the user may navigate web pages. Examples of such user-interactive interface elements include, but are not limited to a forward button, a back button, a reload button, etc.

Figure 7:
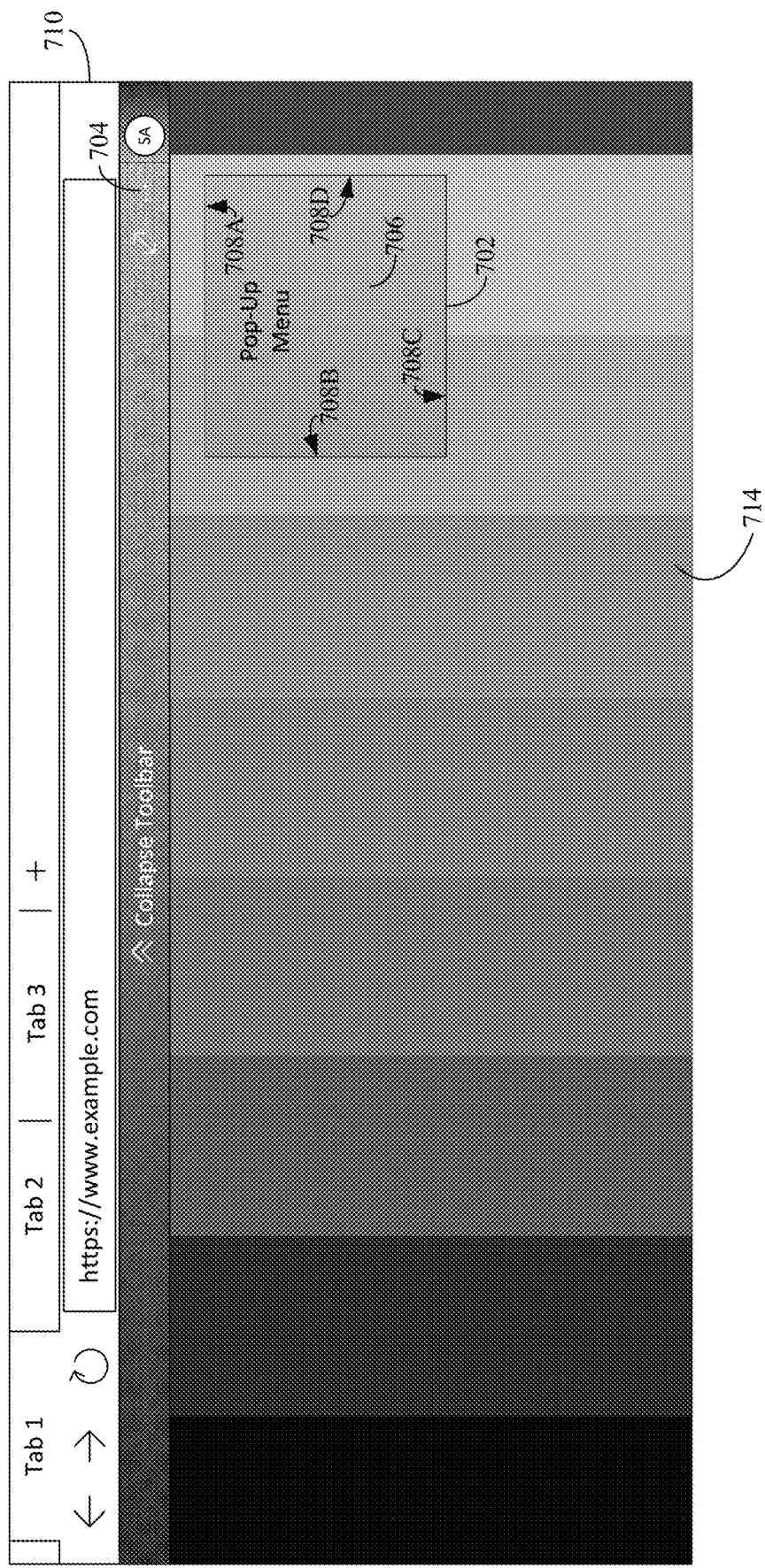
FIG. 7 depicts an example GUI screen comprising a browser window in accordance with a further example embodiment.

In accordance with one or more embodiments, a determined visualization scheme (as described throughout herein) may be applied to additional display elements that may be displayed via a GUI. Such additional display elements include, but are not limited to, pop-up menus or boxes, dialog menus or boxes, etc. For instance, FIG. 7 depicts an example GUI screen 700 comprising a browser window 710 of a browser (e.g., browser 104) in which a web page 714 is displayed in accordance with an example embodiment. Browser window 710 and web page 714 are examples of browser window 210 and web page 714, respectively, as described above with reference to FIG. 2A. In the example shown in FIG. 7, a user causes a pop-up menu 702 to be rendered via browser window 710 (e.g., via user interaction with a user-interactive element 704). In accordance with the embodiments described herein, transparency effect generator 400 may determine pixel values of a portion of the graphic of web page 714 on which pop-up menu 702 is rendered, determine a visualization scheme based on such pixel values, and apply the visualization scheme to pop-up menu 702. For example, as shown in FIG. 7, a visualization scheme 706 has been applied to pop-up menu 702 based on pixel values of the portion of the graphic on which pop-up menu 702 is overlaid such that pop-up menu 702 appears to be semi-transparent.

To determine the portion of the graphic from which pixel values are to be sampled, transparency effect generator 400 may determine one or more edges (e.g., edge 708A, 708B, 708C, and/or 708D) of pop-up menu 702, a height of pop-up menu 702, and/or a width of pop-up menu 702. Transparency effect generator 400 samples the pixel values of the portion of the graphic that appears behind pop-up menu 702 as defined by with the determined edges 708A, 708B, 708C, and/or 708D of pop-up menu 702, the determined width of pop-up menu 702, and/or the determined height of pop-up menu 702.

Still further, a determined visualization scheme may be exposed to other applications or an operating system executing on a computing device (e.g., computing device 102) on which the browser executes. For instance, the browser may expose an application programming interface (API) by which other processes (e.g., applications or an operating system) may utilize to retrieve the visualization scheme determined by the browser. Such processes may apply the retrieved visualization scheme to various display elements utilized thereby.

It is further noted that while the embodiments described herein are directed to browser applications (e.g., browser application 104), the embodiments described herein are not so limited. For instance, the techniques described herein may be applied to GUIs provided by other types of applications (e.g., video conferencing applications, word processing applications, spreadsheet applications, video games etc.) that render display elements. In accordance with such embodiments, transparency effect generator 400 may be incorporated in such applications and executed thereby and be configured to determine a visualization scheme for a display element provided via the GUI of the application in which transparency effect generator 400 is incorporated based on pixel values of other display elements provided via the GUI.

It is also noted that the techniques described herein may be applied to any content (e.g., graphics, images, videos, etc.) that can be converted into pixel values. For instance, three-dimensional (3D) graphics may undergo a rasterization process in which vector data corresponding to the 3D graphics is converted into pixel values. Such pixel values may be utilized to determine a visualization scheme for a particular display element.

IV. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including in FIGS. 1-7, along with any modules, components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP)), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 8:
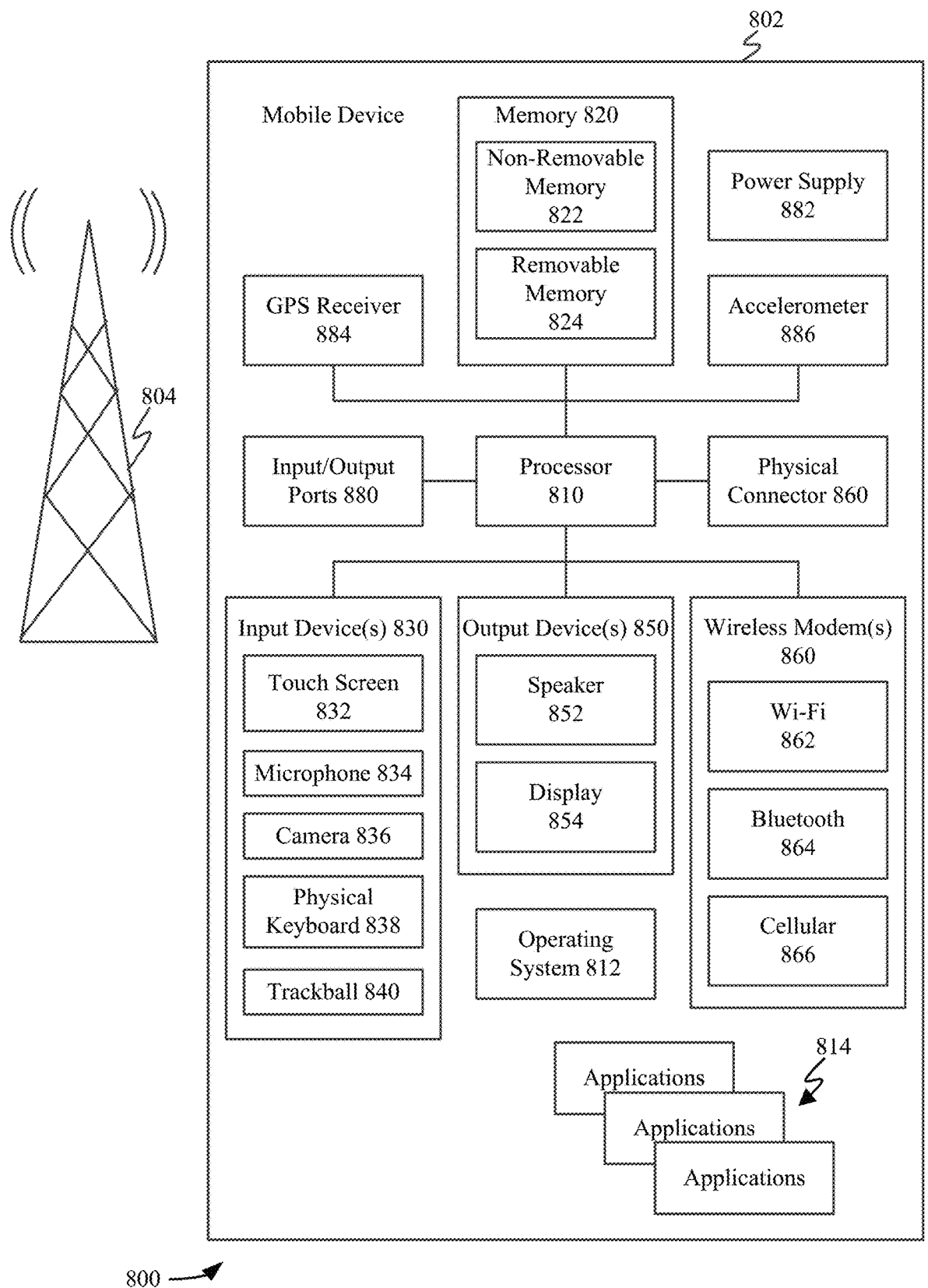
FIG. 8 is a block diagram of an exemplary user device in which embodiments may be implemented.

FIG. 8 is a block diagram of an exemplary mobile system 800 that includes a mobile device 802 that may implement embodiments described herein. For example, mobile device 802 may be used to implement any system, client, or device, or components/subcomponents thereof, in the preceding sections. As shown in FIG. 8, mobile device 802 includes a variety of optional hardware and software components. Any component in mobile device 802 can communicate with any other component, although not all connections are shown for ease of illustration. Mobile device 802 can be any of a variety of computing devices (e.g., cell phone, smart phone, handheld computer, Personal Digital Assistant (PDA)) and can allow wireless two-way communications with one or more mobile communications networks 804, such as a cellular or satellite network, or with a local area or wide area network.

Mobile device 802 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components of mobile device 802 and provide support for one or more application programs 814 (also referred to as "applications" or "apps"). Application programs 814 may include common mobile computing applications (e.g., e-mail applications, calendars, contact managers, web browsers, messaging applications) and any other computing applications (e.g., word processing applications, mapping applications, media player applications).

Mobile device 802 can include memory 820. Memory 820 can include non-removable memory 822 and/or removable memory 824. Non-removable memory 822 can include RAM, ROM, flash memory, a hard disk, or other well-known memory devices or technologies. Removable memory 824 can include flash memory or a Subscriber Identity Module (SIM) card, which is well known in GSM communication systems, or other well-known memory devices or technologies, such as "smart cards." Memory 820 can be used for storing data and/or code for running operating system 812 and application programs 814. Example data can include web pages, text, images, sound files, video data, or other data to be sent to and/or received from one or more network servers or other devices via one or more wired or wireless networks. Memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 820. These programs include operating system 812, one or more application programs 814, and other program modules and program data. Examples of such application programs or program modules may include, for example, computer program logic (e.g., computer program code or instructions) for implementing one or more of browser 104, transparency effect generation script 116, and transparency effect generator 400, along with any components and/or subcomponents thereof, as well as the flowcharts/flow diagrams described herein (e.g., flowchart 300 and/or flowchart 500), including portions thereof, and/or further examples described herein.

Mobile device 802 can support one or more input devices 830, such as a touch screen 832, a microphone 834, a camera 836, a physical keyboard 838 and/or a trackball 840 and one or more output devices 850, such as a speaker 852 and a display 854. Other possible output devices (not shown) can include piezoelectric or other haptic output devices. Some devices can serve more than one input/output function. For example, touch screen 832 and display 854 can be combined in a single input/output device. Input devices 830 can include a Natural User Interface (NUI).

One or more wireless modems 860 can be coupled to antenna(s) (not shown) and can support two-way communications between processor 810 and external devices, as is well understood in the art. Modem 860 is shown generically and can include a cellular modem 866 for communicating with the mobile communication network 804 and/or other radio-based modems (e.g., Bluetooth 864 and/or Wi-Fi 862). At least one wireless modem 860 is typically configured for communication with one or more cellular networks, such as a GSM network for data and voice communications within a single cellular network, between cellular networks, or between the mobile device and a public switched telephone network (PSTN).

Mobile device 802 can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components of mobile device 802 are not required or all-inclusive, as any components can be deleted and other components can be added as would be recognized by one skilled in the art.

In an embodiment, mobile device 802 is configured to implement any of the above-described features of flowcharts herein. Computer program logic for performing any of the operations, steps, and/or functions described herein may be stored in memory 820 and executed by processor 810.

Figure 9:
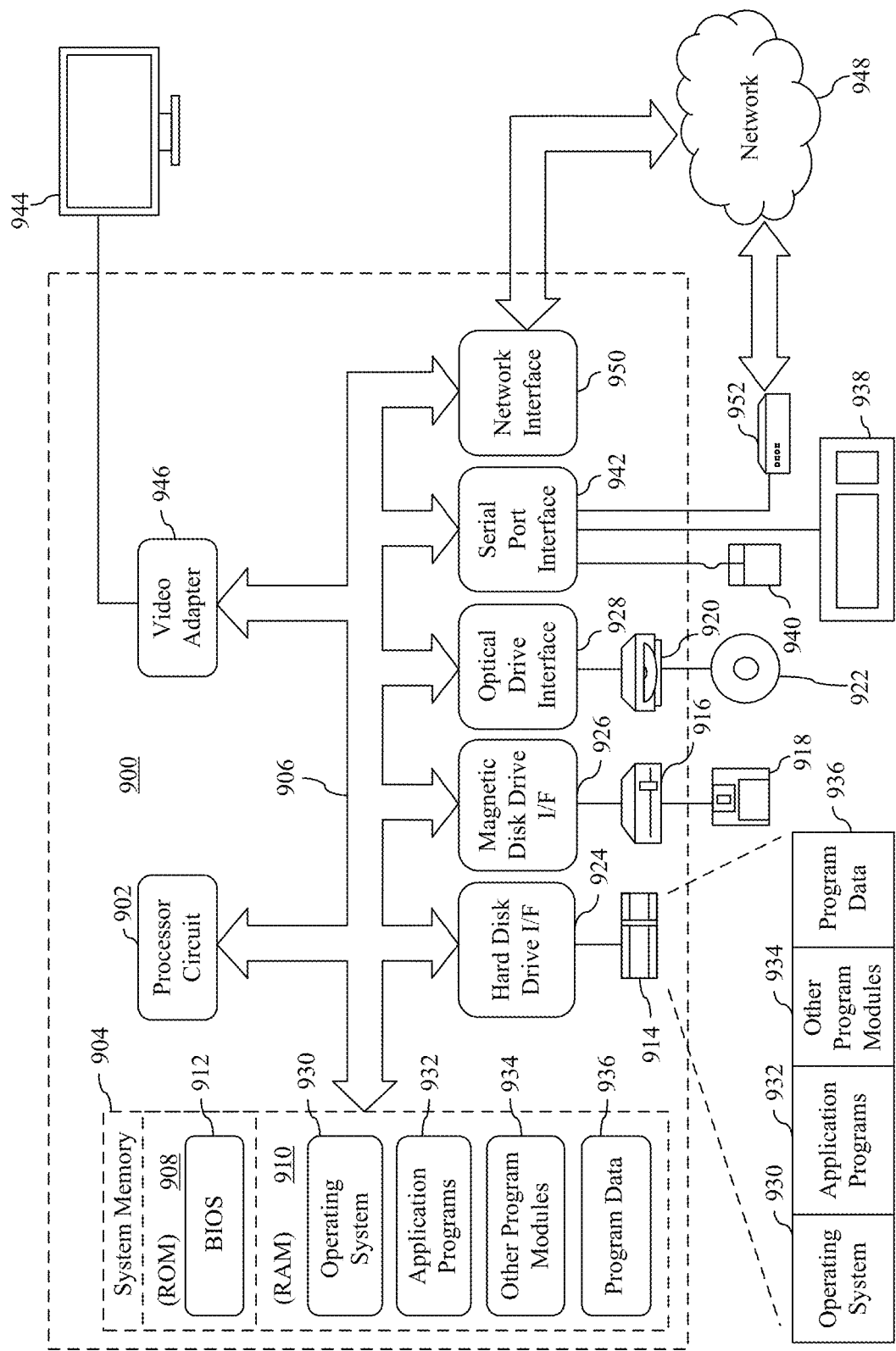
FIG. 9 is a block diagram of an example processor-based computer system that may be used to implement various embodiments.

FIG. 9 depicts an exemplary implementation of a computing device 900 in which embodiments may be implemented. For example, embodiments described herein may be implemented in one or more computing devices similar to computing device 900 in stationary or mobile computer embodiments, including one or more features of computing device 900 and/or alternative features. The description of computing device 900 provided herein is provided for purposes of illustration, and is not intended to be limiting. Embodiments may be implemented in further types of computer systems and/or game consoles, etc., as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing embodiments described herein, including one or more of browser 104, transparency effect generation script 116, and transparency effect generator 400, along with any components and/or subcomponents thereof, as well as the flowcharts/flow diagrams described herein (e.g., flowchart 300 and/or flowchart 500), including portions thereof, and/or further examples described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard). In addition to display screen 944, computing device 900 may include other peripheral output devices (not shown) such as speakers and printers.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 9, or may be connected to bus 906 using another interface type, including a parallel interface.

As used herein, the terms "computer program medium," "computer-readable medium," and "computer-readable storage medium," etc., are used to refer to physical hardware media. Examples of such physical hardware media include the hard disk associated with hard disk drive 914, removable magnetic disk 918, removable optical disk 922, other physical hardware media such as RAMs, ROMs, flash memory cards, digital video disks, zip disks, MEMs, nanotechnology-based storage devices, and further types of physical/tangible hardware storage media (including memory 920 of FIG. 9). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of embodiments discussed herein. Accordingly, such computer programs represent controllers of the computing device 900.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

V. Additional Example Embodiments

A system is described herein. The system includes: at least one processor circuit; at least one memory that stores program code configured to be executed by the at least one processor circuit, the program code comprising: a pixel value determiner configured to determine a plurality of pixel values of a portion of a first display element of a graphical user interface that is non-overlapping with a second display element displayed via the graphical user interface; a visualization scheme determiner configured to determine a visualization scheme that emulates a visual effect based on the determined plurality of pixel values; and a visualization scheme applier configured to apply the visualization scheme to the second display element, said applying causing the second display element to appear semi-transparent.

In one embodiment of the foregoing system, the portion of the first display element is adjacent to an edge of the second display element.

In one embodiment of the foregoing system, the visualization scheme determiner is configured to determine the visualization scheme by: subdividing the portion of the first display element that is adjacent to the edge of the second display element into a plurality of first display element sections; and for each first display element section of the plurality of first display element sections, determining an average value for the first display element section based on a plurality of pixel values of the first display element section, wherein the visualization scheme is based on the average values determined for the plurality of first display element sections.

In one embodiment of the foregoing system, the visualization scheme determiner is further configured to generate a gradient based on the average values generated for the plurality of first display element sections, the gradient being the visualization scheme.

In one embodiment of the foregoing system, the visualization scheme applier is configured to apply the visualization scheme by: updating a background property of a cascaded style sheet tag associated with the second display element to call a linear gradient function that specifies the average values generated for the plurality of first display element sections.

In one embodiment of the foregoing system, the first display element comprises at least one of: a graphic generated via a hypertext markup language (HTML)-based canvas tag; an image rendered via an HTML-based image tag; or video content rendered via an HTML-based video tag.

In one embodiment of the foregoing system, the second display element comprises a menu toolbar that is adjacent to the first display element.

A method is also described herein. The method includes determining a plurality of pixel values of a portion of a first display element of a graphical user interface that is non-overlapping with a second display element displayed via the graphical user interface; determining a visualization scheme that emulates a visual effect based on the determined plurality of pixel values; and applying the visualization scheme to the second display element, said applying causing the second display element to appear semi-transparent.

In one embodiment of the foregoing method, the portion of the first display element is adjacent to an edge of the second display element.

In one embodiment of the foregoing method, said determining the visualization scheme comprises: subdividing the portion of the first display element that is adjacent to the edge of the second display element into a plurality of first display element sections; and for each first display element section of the plurality of first display element sections, determining an average value for the first display element section based on a plurality of pixel values of the first display element section, wherein the visualization scheme is based on the average values determined for the plurality of first display element sections.

In one embodiment of the foregoing method, the method further comprises:
generating a gradient based on the average values generated for the plurality of first display element sections, the gradient being the visualization scheme.

In one embodiment of the foregoing method, said applying the visualization scheme comprises: updating a background property of a cascaded style sheet tag associated with the second display element to call a linear gradient function that specifies the average values generated for the plurality of first display element sections.

In one embodiment of the foregoing method, the first display element comprises at least one of: a graphic generated via a hypertext markup language (HTML)-based canvas tag; an image rendered via an HTML-based image tag; or video content rendered via an HTML-based video tag.

In one embodiment of the foregoing method, the second display element comprises a menu toolbar that is adjacent to the first display element.

A computer-readable storage medium having program instructions recorded thereon that, when executed by at least one processor of a computing device, perform a method implemented by a browser application. The method includes: determining a plurality of pixel values of a portion of a first display element of a graphical user interface that is non-overlapping with a second display element displayed via the graphical user interface; determining a visualization scheme that emulates a visual effect based on the determined plurality of pixel values; and applying the visualization scheme to the second display element, said applying causing the second display element to appear semi-transparent.

In one embodiment of the foregoing computer-readable storage medium, the portion of the first display element is adjacent to an edge of the second display element.

In one embodiment of the foregoing computer-readable storage medium, said determining the visualization scheme comprises: subdividing the portion of the first display element that is adjacent to the edge of the second display element into a plurality of first display element sections; and for each first display element section of the plurality of first display element sections, determining an average value for the first display element section based on a plurality of pixel values of the first display element section, wherein the visualization scheme is based on the average values determined for the plurality of first display element sections.

In one embodiment of the foregoing computer-readable storage medium, the method further comprises: generating a gradient based on the average values generated for the plurality of first display element sections, the gradient being the visualization scheme.

In one embodiment of the foregoing computer-readable storage medium, said applying the visualization scheme comprises: updating a background property of a cascaded style sheet tag associated with the second display element to call a linear gradient function that specifies the average values generated for the plurality of first display element sections.

In one embodiment of the foregoing computer-readable storage medium, the first display element comprises at least one of: a graphic generated via a hypertext markup language (HTML)-based canvas tag; an image rendered via an HTML-based image tag; or video content rendered via an HTML-based video tag.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system, comprising:
   at least one processor circuit;
   at least one memory that stores program code configured to be executed by the at least one processor circuit, the program code comprising:
     a pixel value determiner configured to determine a plurality of pixel values of a portion of a first display element of a graphical user interface that is non-overlapping with a second display element displayed via the graphical user interface;
     a visualization scheme determiner configured to determine a visualization scheme that emulates a visual effect based on the determined plurality of pixel values; and
     a visualization scheme applier configured to apply the visualization scheme to the second display element, said applying causing the second display element to appear semi-transparent.

2. The system of claim 1, wherein the portion of the first display element is adjacent to an edge of the second display element.

3. The system of claim 2, wherein the visualization scheme determiner is configured to determine the visualization scheme by:
   subdividing the portion of the first display element that is adjacent to the edge of the second display element into a plurality of first display element sections; and
   for each first display element section of the plurality of first display element sections, determining an average value for the first display element section based on a plurality of pixel values of the first display element section,
   wherein the visualization scheme is based on the average values determined for the plurality of first display element sections.

4. The system of claim 3, wherein the visualization scheme determiner is further configured to generate a gradient based on the average values generated for the plurality of first display element sections, the gradient being the visualization scheme.

5. The system of claim 4, wherein the visualization scheme applier is configured to apply the visualization scheme by:
   updating a background property of a cascaded style sheet tag associated with the second display element to call a linear gradient function that specifies the average values generated for the plurality of first display element sections.

6. The system of claim 1, wherein the first display element comprises at least one of:
   a graphic generated via a hypertext markup language (HTML)-based canvas tag;
   an image rendered via an HTML-based image tag; or
   video content rendered via an HTML-based video tag.

7. The system of claim 1, wherein the second display element comprises a menu toolbar that is adjacent to the first display element.

8. A method, comprising:
   determining a plurality of pixel values of a portion of a first display element of a graphical user interface that is non-overlapping with a second display element displayed via the graphical user interface;
   determining a visualization scheme that emulates a visual effect based on the determined plurality of pixel values; and
   applying the visualization scheme to the second display element, said applying causing the second display element to appear semi-transparent.

9. The method of claim 8, wherein the portion of the first display element is adjacent to an edge of the second display element.

10. The method of claim 9, wherein said determining the visualization scheme comprises:
    subdividing the portion of the first display element that is adjacent to the edge of the second display element into a plurality of first display element sections; and
    for each first display element section of the plurality of first display element sections, determining an average value for the first display element section based on a plurality of pixel values of the first display element section,
    wherein the visualization scheme is based on the average values determined for the plurality of first display element sections.

11. The method of claim 10, further comprising:
    generating a gradient based on the average values generated for the plurality of first display element sections, the gradient being the visualization scheme.

12. The method of claim 11, wherein said applying the visualization scheme comprises:
    updating a background property of a cascaded style sheet tag associated with the second display element to call a linear gradient function that specifies the average values generated for the plurality of first display element sections.

13. The method of claim 8, wherein the first display element comprises at least one of:
    a graphic generated via a hypertext markup language (HTML)-based canvas tag;
    an image rendered via an HTML-based image tag; or
    video content rendered via an HTML-based video tag.

14. The method of claim 8, wherein the second display element comprises a menu toolbar that is adjacent to the first display element.

15. A computer-readable storage medium having program instructions recorded thereon that, when executed by a processor of a computing device, perform a method implemented by a browser application, the method comprising:
    determining a plurality of pixel values of a portion of a first display element of a graphical user interface that is non-overlapping with a second display element displayed via the graphical user interface;
    determining a visualization scheme that emulates a visual effect based on the determined plurality of pixel values; and
    applying the visualization scheme to the second display element, said applying causing the second display element to appear semi-transparent.

16. The computer-readable storage medium of claim 15, wherein the portion of the first display element is adjacent to an edge of the second display element.

17. The computer-readable storage medium of claim 16, wherein said determining the visualization scheme comprises:

subdividing the portion of the first display element that is adjacent to the edge of the second display element into a plurality of first display element sections; and for each first display element section of the plurality of first display element sections, determining an average value for the first display element section based on a plurality of pixel values of the first display element section, wherein the visualization scheme is based on the average values determined for the plurality of first display element sections.

18. The computer-readable storage medium of claim 17, the method further comprising:

generating a gradient based on the average values generated for the plurality of first display element sections, the gradient being the visualization scheme.

19. The computer-readable storage medium of claim 18, wherein said applying the visualization scheme comprises:

updating a background property of a cascaded style sheet tag associated with the second display element to call a linear gradient function that specifies the average values generated for the plurality of first display element sections.

20. The computer-readable storage medium of claim 15, wherein the first display element comprises at least one of:

a graphic generated via a hypertext markup language (HTML)-based canvas tag;

an image rendered via an HTML-based image tag; or video content rendered via an HTML-based video tag.

\* \* \* \* \*